3,031,352
ORGANOPOLYSILOXANES
William J. Bobear, Latham, N.Y., assignor to General
Electric Company, a corporation of New York
No Drawing. Filed Aug. 26, 1957, Ser. No. 680,438
10 Claims. (Cl. 154—2.6)

This invention is concerned with improved organopolysiloxanes convertible to the cured, solid, elastic state. More particularly, the invention relates to filled organopolysiloxane compositions having reduced structure and lower knit time, said compositions comprising (1) an organopolysiloxane convertible to the cured, solid, elastic state, and (2) a structure-reducing additive comprising an organic carbonate in an amount equal to from 0.05 to 10 percent, by weight, based on the weight of convertible organopolysiloxane.

When organopolysiloxanes convertible (for instance, by heat in the presence of a curing agent or by irradiation with high energy electrons) to the cured, solid, elastic state are mixed with certain fillers, especially certain finely divided silicas such as silica aerogel, fume silicas, precipitated silicas, etc. (many examples of such finely divided fillers being described in Warrick Patent 2,541,-137), it will be found that on standing even for short periods of time, for instance, even as little as one day, the compounded material becomes tough and nervy. This toughness or nerve of the filled, curable organopolysiloxane, which is also known as "structure," is recognized by the presence of an undesirable snap and difficulty in rendering plastic the rubber compound by usual mechanical working. These undesirable characteristics may occur even while these particular types of fillers are being added on suitable equipment to the aforementioned convertible organopolysiloxane. After incorporation of these structure-inducing fillers in the convertible organopolysiloxane, it will also be found that after the filled compound is stored for any length of time, for instance, from about two days to several months, this toughness and nerve increase to such a point that excessive milling times are required to form a plastic continuous film around the faster roll of a two-roll differential mill (whose rolls are operating at different speeds) normally used for rendering the stored compound plastic prior to further processing of the latter such as for purposes of incorporating other fillers and additives, for instance curing agents, compression set additives, etc., or for "freshening" the filled compound so as to give better flow in subsequent molding, calendering, or extrusion operations. This inability to obtain a plastic film in a short period of time is due to the fact that the compound on the rolls will not knit readily within a reasonable period of time; in some instances, the curable, filled compound will not knit at all even after long periods of milling, and it is often impossible to attain a satisfactory plastic (i.e., soft, pressure-flowable) condition with the result that the latter condition requires discarding the filled compound with obvious economic losses.

The term "knit" or "knitting" referred to in the present description is intended to mean the ready fusing of the laps and folds of a vulcanizable silicone rubber stock to form a continuous, homogeneous, smooth sheet during milling. A more complete definition of this knitting property is found disclosed in the book, The Vanderbilt 1948 Rubber Handbook, page 79, ninth edition, published in 1948 by the R. T. Vanderbilt Company, 230 Park Avenue, New York, N.Y. The term "knit time" is intended to mean the time required to give this homogeneous, fused sheet.

Unexpectedly, I have discovered that the incorporation of an organic carbonate, even in small amounts, in such difficultly processable, convertible organopolysiloxanes containing the structure-inducing fillers, materially reduces the structure while, at the same time, substantially reducing the knit time within which a plastic, continuous sheet can be attained on the rolls, thus making it much easier to mill the filled organopolysiloxane and to incorporate other additives. The incorporation of these organic carbonates gives the above desirable results, even after the mixture of the convertible organopolysiloxane and structure-inducing filler (hereinafter this mixture will be designated as "silicone rubber compound") has been stored at normal or slightly elevated temperatures for times as long as 1 to 2 or more months.

It is therefore one of the objects of this invention to reduce the structure of filled, convertible organopolysiloxanes containing a structure-inducing filler.

It is a further object of the invention to reduce the time in which a convertible polysiloxane containing a filler which, in combination with the former induces structure formation, can be milled in relatively short periods of time to give a plastic, continuous sheet suitable for further processing of additives.

Another object of the invention is to enhance the storage stability of convertible organopolysiloxanes containing structure-inducing fillers, especially certain finely divided silica fillers, so that the milling of the silicone rubber compound to freshen the latter for further processing does not require excessive milling times.

It is a still further object of the invention to improve under some circumstances the physical properties of cured, solid, elastic organopolysiloxanes containing reinforcing, i.e., structure-inducing fillers.

Other objects of the invention will become apparent from a description thereof which follows.

The term "organic carbonate" is intended to include polyether derivatives of carbonates having the grouping (I)
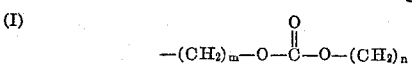

where $m$ and $n$ are integers equal to from 2 to 7, inclusive. Included among such compounds are, for instance, alkylene glycol carbonates having the general formula (II)
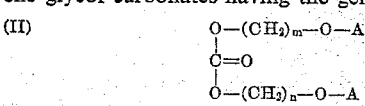

where $m$ and $n$ have the meaning given above and preferably are the same, and A stands for an alkenyl radical, for instance vinyl, allyl, acrylyl (e.g.,

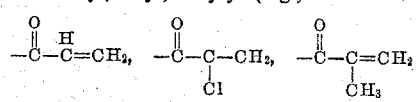

etc.), crotonyl, etc. Included among such alkenyl carbonates are, for instance, allyl dipropylene glycol carbonate, allyl dibutylene glycol carbonate, allyl dipentylene glycol carbonate, allyl diglycol carbonate, vinyl digycol carbonate, that is, alkenyl dipolymethylene glycol carbonates.

A still further group of organic carbonates which may be employed in the practice of the present invention are, for instance, those corresponding to the general formula (III)
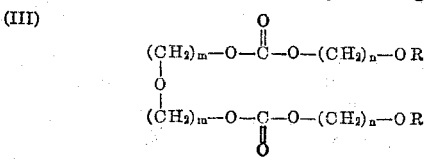

where $m$ and $n$ have the meanings given above and R is an alkyl radical containing from 2 to 10 carbon atoms, for instance ethyl, propyl, butyl, isobutyl, amyl, octyl, 2-ethylhexyl, decyl, etc. The composition which has proved to be eminently suitable in the practice of my present invention is diethylene glycol bis-(2-n-butoxy ethyl carbonate) having the formula (IV) 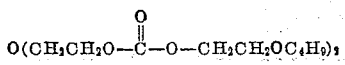

which for brevity will hereinafter be referred to as "butoxy glycol carbonate."

Other glycol carbonates which may be used with good results are, for instance, those corresponding to the general formula (V) 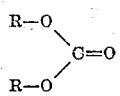

where R is selected from the class consisting of alkyl (e.g., methyl, ethyl, propyl, butyl, etc.), aryl (e.g., phenyl, naphthyl, biphenyl, etc.), alkaryl (e.g., tolyl, xylyl, ethylphenyl, etc.), aralkyl (e.g., benzyl, phenylethyl, etc.), and substituted organic groups, e.g., halogenated, allyl, aryl, etc. radicals.

The organic carbonate may be a hydrocarbon carbonate of the formula (VI) 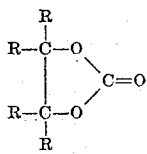

where R has the meaning given above and in addition may be hydrogen.

Organic polycarbonates also may be employed as, for instance, those containing the

grouping attached either directly or through aliphatic carbon to aromatic nuclei such as those having the recurring units:

(VII) 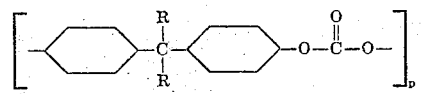

where R has the meanings given above and p is an integer equal to 2 or more. Further examples of organic polycarbonates which can be used herein are found disclosed and claimed in U.S. Patents 2,789,509 and 2,789,964–972 and in the copending application of Daniel W. Fox, Serial No. 520,166, filed July 5, 1955, and in the copending application of Eugene P. Goldberg, Serial No. 638,239, filed February 5, 1957, both assigned to the same assignee as the present invention. By reference these patents and applications are made part of the disclosures of the present application.

Included among the monomeric compounds corresponding to the above formulas are, for instance, ethylene carbonate having the formula

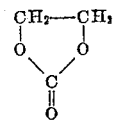

glycerol carbonate having the formula

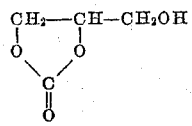

propylene carbonate having the formula

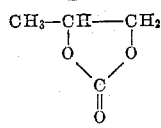

bis(orthochlorophenyl) carbonate having the formula

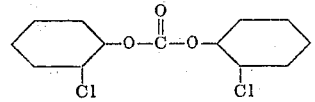

bis(orthophenyl phenyl) carbonate having the formula

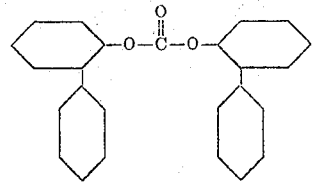

bis(orthocresol) carbonate having the formula

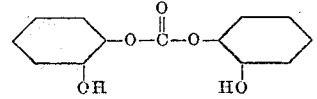

as well as other carbonates, for instance, orthomethoxyphenyl carbonate, diethyl carbonate, di-n-butyl carbonate, etc.

In the specification and in the claims, for brevity, the convertible organopolysiloxanes, which may be viscous masses or gummy solids (depending on the state of condensation of the starting organopolysiloxane, polymerizing agent, etc.), will hereinafter be referred to as "convertible organopolysiloxanes" or, more specifically, as "convertible methylpolysiloxanes." Although convertible organopolysiloxanes with which the present invention is concerned are now well known in the art, for the purpose of showing the various convertible organopolysiloxanes which may be employed in the practice of the present invention, attention is directed to the convertible organopolysiloxanes disclosed in Agens Patent 2,448,756 and Sprung et al. Patent 2,448,556, the latter two patents being issued September 7, 1948; Sprung Patent 2,484,595, issued October 11, 1949; Krieble et al. Patent 2,457,688, issued December 28, 1948; Marsden Patent 2,521,528, issued September 5, 1950; all the foregoing patents being assigned to the same assignee as the present invention; Hyde Patent 2,490,357, issued December 5, 1949; and Warrick Patent 2,541,137, issued February 13, 1951.

It will, of course, be understood by those skilled in the art that other convertible organopolysiloxanes containing the same or different silicon-bonded organic substituents (e.g., methyl, ethyl, propyl, vinyl, allyl, phenyl, tolyl, xylyl, benzyl, phenylethyl, naphthyl, chlorphenyl, both methyl and phenyl, etc. radicals) connected to the silicon atoms by carbon-silicon linkages, may be employed in the present invention without departing from the scope of this invention. The particular convertible organopolysiloxane used is not critical and may be any one of those described in the foregoing patents generally obtained by condensation of a liquid organopolysiloxane containing an average of from about 1.95, preferably from about 1.98 to about 2.05 organic groups per silicon atom. The condensing agents which may be employed are well known in the art and may include, for instance, ferric chloride hexahydrate, phenyl phosphoryl chloride; alkaline condensing agents, such as potassium hydroxide, sodium hydroxide, etc. Each convertible organopolysiloxane generally comprises a polymeric diorganosiloxane which may contain, if desired, for example, up to 2 mol percent copolymerized monoorganosiloxane, for example, copolymerized monomethylsiloxane and small molar (e.g., less than 1 mol) percent of triorganosiloxy units, e.g., trimethylsiloxy units. Generally, I prefer to use as the starting liquid organopolysiloxanes (or mixtures of organopolysiloxanes) from which the convertible, for example, heat-convertible organopolysiloxanes are prepared, ones which contain about 1.999 to 2.01 inclusive, organic groups, for example, methyl groups per silicon atom, and where preferably more than 50 percent, e.g., more than 75 percent, of the silicon atoms in the polysiloxane contain two silicon-bonded lower alkyl groups. The convertible organopolysiloxane thus prepared also advantageously contains silicon atoms to which at least 50 percent of the hydrocarbon groups attached thereto are lower alkyl radicals, e.g., methyl radicals.

The starting organopolysiloxanes used to make the convertible organopolysiloxanes advantageously comprise organic constituents consisting essentially of monovalent organic radicals attached to silicon by carbon-silicon linkages, and in which essentially all the siloxane units consist of units of the structural formula $R_2SiO$, where R is preferably a radical of the group consisting of methyl and phenyl radicals. At least 50 to 75 percent of the total number of R groups are preferably methyl radicals. The polysiloxane may be one in which all the siloxane units are $(CH_3)_2SiO$, or the siloxane may be a copolymer of dimethylsiloxane with a minor amount (e.g., from 1 to 20 or more mol percent) of any of the following units, alone or in combination therewith: $C_6H_5(CH_3)SiO$ and $(C_6H_5)_2SiO$. The presence of halogen, e.g., chlorine, atoms on the phenyl nucleus is not precluded.

Where alkenyl groups are attached to silicon by carbon-silicon linkages, it is preferable that the alkenyl groups (for instance, vinyl groups, allyl groups, etc.) be present in an amount equal to from 0.05 to 2 mol percent of the total number of silicon-bonded organic groups in the convertible organopolysiloxane.

The amount of additive employed for reducing structure and knit time of the filled convertible organopolysiloxane may be varied within wide limits. On a weight basis, amounts as low as 0.1% of the additive, based on the weight of the convertible organopolysiloxane, will be found to exert improvement in these properties. Generally, I prefer to employ the additives in amounts ranging from about 0.1 to 10%, by weight, based on the weight of the convertible organopolysiloxane.

The finely divided fillers which have caused the above-described structure build-up and undesirable length of time for knitting of the convertible organopolysiloxane are usually finely divided silica fillers, many of which are free of hydroxyl groups either in the form of adsorbed moisture or of silicon-bonded hydroxyl groups, depending on the method by which they are prepared. Under some conditions of manufacture, these structure-inducing fillers may contain hydroxyl groups, for instance, hydroxyl groups bonded directly to silicon of the silica molecule, but due to modification of such silicas, for instance, by the introduction of silicon-bonded alkoxy groups in place of some of the silicon-bonded hydroxyl groups, increased structure and knit times result when these types of silica fillers are incorporated in convertible organopolysiloxanes. These silica fillers are reinforcing fillers in contrast to other fillers of the non-reinforcing and usually non-structure-forming type, such as titanium dioxide, lithopone, calcium carbonate, etc. Examples of such structure-causing silica fillers may be found described in U.S. Patents 2,541,137, 2,610,167 and 2,657,149. Such structure-causing fillers may be slightly acidic or alkaline (i.e., have pH's below or above 7) depending upon the method of manufacture, and may be obtained through an aerosol-aerogel process, by fuming processes such as by the vapor phase burning of silicon tetrachloride or ethyl silicate, etc.

The amount of filler used in combination with the convertible organopolysiloxane may obviously be varied within wide limits, for instance, from about 10 to 300 percent, by weight, of the filler based on the weight of the convertible organopolysiloxane. The exact amount of filler used will depend upon such factors as, for instance, the application for which the convertible organopolysiloxane is intended, the type of filler employed, (e.g., density of the filler), the type of convertible organopolysiloxane employed, etc. Structure difficulty and excessive knit times are particularly troublesome when the above-described finely divided silica fillers comprise, by weight, from 0.2 to 0.6 part filler per part convertible organopolysiloxane. Obviously, mixtures of these reinforcing fillers, either alone or in combination with non-reinforcing fillers wherein the reinforcing filler comprises a sufficient amount, usually a majority of the weight of the fillers, to cause the undesirable structure build-up and increased knit time, may also be employed. Examples of other fillers which may be incorporated in combination with the structure-inducing fillers may be, for instance, titanium dioxide, lithopone, zinc oxide, zirconium silicate, iron oxide, calcium carbonate, etc.

Various curing agents to effect more rapid conversion of the convertible organopolysiloxane to the cured, solid, elastic state may be incorporated. Among such curing agents may be mentioned, for instance, benzoyl peroxide, tertiary butyl perbenzoate, bis-(2,4-dichlorobenzoyl) peroxide, etc. These curing agents (or "vulcanization accelerators" as they are often designated) may be present in amounts ranging from about 0.1 to as high as 4 to 8 percent or more, by weight, based on the weight of the convertible organopolysiloxane. High energy electron irradiation without curing agents may also be employed for vulcanizing purposes.

The manner in which the present invention may be practiced may be varied widely. Although the organic carbonate additive may be incorporated in the convertible organopolysiloxane before any of the structure-inducing fillers are added in order to obviate the above difficulties of structure build-up and excessive knit times resulting from the subsequent presence of the above-described reinforcing, structure-inducing fillers, I prefer to incorporate the organic carbonate early in the addition of the filler to the convertible organopolysiloxane, preferably shortly before structure has had an opportunity to build up or the knit time has begun to increase. This incorporation of the additive may take place on usual rubber differential milling rolls. The presence of the additive will enable one to readily mill the filled silicone rubber compound, and in a relatively short period of time, much less than when the additive is absent, the rubber compound will begin to sheet and form a continuous (i.e., unbroken) film on the rolls, thereby permitting the incorporation of curing agents, dyes, pigments, compression set additives, etc. when desired for use with convertible organopolysiloxanes. In the absence of the additive, and after storage of the silicone rubber compound containing the structure-inducing filler, it will be found that long periods of time will be required even before the silicone rubber compound will start to form a sheet, and longer times with expire before the compound will adhere to the rolls; usually a non-continuous, lace-like effect will be encountered for a long time before an unbroken, adhering sheet is attained.

Alternatively, the organic carbonate may be added to the convertible organopolysiloxane, which can then be blended with the structure-inducing filler at some future time. The presence of the glycol carbonate additive will greatly reduce or eliminate the usual structure formation in the future and will also result in more reasonable knit times.

When the silicone rubber compound is to be molded, the latter is heated in a mold at temperatures of the order of about 100° to 150° C. for varying lengths of time, for instance, from about 5 to 30 minutes or more. Molding pressures ranging from about 10 to 500 p.s.i. or more are advantageously used. The molded product is preferably given a further heat treatment at elevated temperatures, for example, for about 1 to 36 hours or more at 150° to 250° C. to bring out the optimum properties of the cured organopolysiloxane.

Where desired, solvent and dispersing media such as toluene, xylene, butanol, etc. may be employed to make solutions and dispersions for coating and impregnating purposes. These coating compositions may be used to treat (e.g., coat and impregnate) various sheet materials, such as glass cloth, asbesto cloth, mica sheets, various fibers, and finely divided fillers, such as mica, glass fibers, asbestos floats, etc. Such treated products may be heated at the requisite temperature to remove solvent or dispersing media (if coating compositions are involved), and thereafter further heat-treated at the elevated temperatures recited previously to convert the organopolysiloxane to the cured, solid, elastic state.

In order that those skilled in the art may better understand how the present invention may be practiced, the following examples are given by way of illustration and not by way of limitation. All parts are by weight. In the following examples, where diphenylsilanediol is used, it was in the form of a 50 weight percent mixture with a convertible methylpolysiloxane.

The knit time test employed in the following examples was conducted as follows: A two-roll differential laboratory mill, 3" x 8", was employed in which the speed ratio was 1.4 to 1 and the faster roll revolved at a speed of about 60 revolutions per minute. The mill roll clearance was adjusted to pass a 12-mil thick soft solder slug at a temperature of around 70° to 90° F. In conducting the test for knit time, 30 grams of the compound under test were added to the nip of the roll in small pieces to permit passage therethrough. A preliminary pass often was required at a somewhat slightly wider setting to reduce the sample thickness. When all of the compound had passed through the nip once, a stop watch was triggered and the timing begun. The compound was added to the nip again and in order to keep the "bank" of compound in motion, it was sometime necessary to open the mill slightly for a brief interval and then return to the predetermined 12-mil adjustment. The timing was continued until the compound became plastic and completely covered the width of the faster roll in the form of a continuous solid film. As soon as this happened, the timing was stopped and this elapsed time was recorded as "knit time."

EXAMPLE 1

A methyl vinyl polysiloxane gum (hereinafter referred to as "methyl vinyl gum") was prepared by co-reacting octamethylcyclotetrasiloxane and tetramethyl tetravinylcyclotetrasiloxane in such proportions that the final polysiloxane gum contained about 0.2 mol percent vinyl groups on the polysiloxane chain, with 0.001 percent, by weight, KOH at a temperature of about 140° to 150° C. for 4 to 5 hours. This methylvinylpolysiloxane gum was soluble in benzene and had an average of about two methyl groups per silicon atom.

EXAMPLE 2

Three formulations were prepared from the methylvinylpolysiloxane gum described in Example 1. The formulations were as follows, as shown in Table I:

Table I

| Ingredient | Formulation Number | | |
| --- | --- | --- | --- |
| | 1 | 2 | 3 |
| | Parts | Parts | Parts |
| Methyl vinyl gum | 100 | 100 | 100 |
| Fume silica (Cab-O-Sil) | 40 | 40 | 40 |
| Diphenylsilanediol | | 4 | 4 |
| Butoxy glycol carbonate | | | 4 |
| Benzoyl peroxide | 2 | 2 | 2 |

Each of the formulations described in Table I was molded for about 15 minutes at 150° C. at a pressure of about 500 p.s.i. and thereafter removed and heated for about 1 hour at 150° C. in an air circulating oven, at the end of which time the physical properties of the sample were determined. The following Table II shows the physical properties of the three samples and illustrates clearly the marked advantage in tensile strength, elongation and tear strength to be derived by the use of the butoxy glycol carbonate.

Table II

| | Sample Number | | |
| --- | --- | --- | --- |
| | 1 | 2 | 3 |
| Tensile, p.s.i. | 733 | 830 | 1,125 |
| Elongation, percent | 190 | 240 | 760 |
| Tear, lb./inch | 38 | 55 | 162 |

The knit time of each of the molding compositions was determined in the manner described previously. The following Table III shows the knit time of the three formulations prior to molding at various stages of shelf life.

Table III

| Time of Aging, days | Sample Number | | |
| --- | --- | --- | --- |
| | 1 | 2 | 3 |
| | Sec. | Sec. | Sec. |
| 19 | [1] 31 | | 0–5 |
| 28 | | | 0 |
| 45 | | 8 | 0–5 |
| 56 | | 13 | 0–5 |

[1] After 5 days.

The above Table III shows that although diphenylsilanediol is known to reduce structure of organopolysiloxane gums containing structure-inducing fillers such as the fume silica, the use of such diphenylsilanediol for the aforesaid purpose being disclosed and claimed in the copending application of Savage and Wormuth, Serial No. 399,148, filed December 18, 1953, assigned to the same assignee as the present invention, the presence of the butoxy glycol carbonate even further reduced the structure to a point where it was essentially zero even after 56 days of shelf aging.

EXAMPLE 3

In this example, the compositions described in Example 2 were employed as adhesives for glass cloth. More particularly, a glass cloth (which had been sized with a vinyl compound) was first dipped in a silicone coating composition composed, by weight, of about 57 parts of the above-described methylpolysiloxane gum, 33 parts calcium carbonate, and about 3 parts polyethyl silicate and 2.25 parts benzoyl peroxide, in the form of a toluene solution of about 10 percent solids. The treated glass cloth was allowed to air-dry and two strips of this cloth were then cured in an oven for 10 minutes at 150° C. and then for 10 minutes at 250° C. Thereafter, Formulation 2 of Example 2 was calendered on one piece of treated cloth and Formulation 3 of Example 2 when calendered on the other piece of treated glass cloth. Each strip was then cut in half and in each case the two halves were laid up front-to-back and were then press-cured for 10 minutes at 150° C. Peel strengths (employing the usual method for testing these strengths) were conducted on the resulting laminates, with the following results. The sample which employed as the adhesive the material containing the butoxy glycol carbonate had a bond strength of 18.7 lb./linear inch, while the sample from which the butoxy glycol carbonate was omitted had a bond strength of only 8.5 lb./linear inch, illustrating clearly the marked cohesive strength induced by the presence of the butoxy glycol carbonate.

EXAMPLE 4

In this example, the same formulations as used in Formulations 2 and 3 of Example 2 were employed with the exception that instead of using the fume silica, there was substituted in its place an equal amount of fume silica which had previously been treated with octamethylcyclotetrasiloxane in the manner disclosed and claimed in the copending application of Glennard R. Lucas, Serial No. 577,450, filed March 2, 1955, and assigned to the same assignee as the present invention. Two parts red iron oxide were also included in each formulation. The moldable formulations (exclusive of benzoyl peroxide) were first mixed in a dough mixer for one hour at a temperature of 110–115° C. Thereafter, samples of each formulation containing the benzoyl peroxide were molded in the form of flat sheets, similarly as was done in Example 2, and the samples were tested for physical properties after further heat aging for one hour at 150° C. in an air circulating oven. The following Table IV shows the physical properties as well as the knit time of the molded samples. Sample 4 contained neither diphenylsilanediol nor the butoxy glycol carbonate, Sample 5 contained the diphenylsilanediol alone, while Sample 6 contained both the butoxy glycol carbonate and the diphenylsilanediol.

Table IV

|  | 4 | 5 | 6 |
|---|---|---|---|
| Tensile, p.s.i | 903 | 790 | 840 |
| Elongation, percent | 200 | 330 | 500 |
| Tear, lb./inch | 36 | 63 | 100 |
| Knit time after 4 months, sec | [1] 20 | 12 | 5 |

[1] Determined after 20 days.

EXAMPLE 5

In this example, the amount of butoxy glycol carbonate was varied in a formulation composed of 100 parts of the methyl vinyl gum described in Example 1, 40 parts of the treated fume silica, described in Example 4, 2 parts red iron oxide, and 2 parts benzoyl peroxide. The following Table V shows the proportions of butoxy glycol carbonate in the various formulations, as well as the physical properties and knit times of the samples. The physical properties were determined after the usual molding cycle (see Example 2) and after further heating in an air circulating oven at 150° C., while the knit time was determined for times ranging from 3 to 28 days.

Table V

| | Physical Properties | Knit Time |
|---|---|---|
| Sample No.: | | |
| 7—4 parts butoxy glycol carbonate | Tensile, 935 p.s.i.<br>Elong., 580%<br>Tear, 109 lb./in | 3 days, 5 sec.<br>14 days, 5 sec.<br>28 days, 0 sec. |
| 8—3 parts butoxy glycol carbonate | Tensile, 935 p.s.i.<br>Elong., 480%<br>Tear, 107 lb./in | 3 days, 0 sec.<br>14 days, 6 sec.<br>28 days, 6 sec. |
| 9—2 parts butoxy glycol carbonate | Tensile, 716 p.s.i.<br>Elong., 360%<br>Tear, 101 lb./in | 3 days, 0 sec.<br>14 days, 7 sec.<br>28 days, 8 sec. |
| 10—1 part butoxy glycol carbonate | Tensile, 600 p.s.i.<br>Elong., 270%<br>Tear, 107 lb./in | 3 days, 0 sec.<br>14 days, 8 sec.<br>28 days, 10 sec. |
| 11—0 part butoxy glycol carbonate | Tensile, 903 p.s.i.<br>Elong., 200%<br>Tear, 36 lb./in | 3 days, 9 sec.<br>5 days, 12 sec.<br>28 days, 25 sec. |

EXAMPLE 6

In this example, 100 parts of a methyl phenyl vinylpolysiloxane gum similar to the methyl vinyl gum described in Example 2 but containing 5.3 mol percent silicon-bonded phenyl groups, 40 parts fume silica, and 1.5 parts benzoyl peroxide, and 4 parts of the butoxy glycol carbonate were milled together and thereafter molded, similarly as was done in Example 2, and thereafter further heat-treated for one hour at 150° C. This molded sample was found to have a tensile strength of 1600 p.s.i., 750% elongation, and 367 lb./in. tear strength.

EXAMPLE 7

In this example a formulation was prepared composed of 100 parts of the methyl vinyl gum (described in Example 1), 40 parts of fume silica treated with octamethylchlorotetrasiloxane (described in Example 4), 2 parts iron oxide and 2 parts benzoyl peroxide. Various organic carbonates were added to this basic formulation in an amount equal to 4 parts, by weight, together with 2 parts diphenylsilanediol. A control was also prepared which did not contain either the diphenylsilanediol or any organic carbonate. The following Table VI shows the physical properties of samples molded at about 150° C. for approximately 15 minutes and thereafter heat aged in an air circulating oven for 1 hour at 150° C. Table VI also shows the knit time of the moldable compositions.

Table VI

| | Physical Properties | Knitting Characteristics | |
|---|---|---|---|
| | | Time of Test, days | Knit Time, sec. |
| Sample No.: | | | |
| 12—No organic carbonate | Tensile, 875 p.s.i.<br>Elong., 280%<br>Tear, 65 lb./in | 4<br>14<br>28 | 5<br>7<br>11 |
| 13—Glycerol carbonate | Tensile, 763 p.s.i.<br>Elong., 380%<br>Tear, 65 lb./in | 4<br>14<br>28 | 3<br>4<br>0 |
| 14—Propylene carbonate | Tensile, 623 p.s.i.<br>Elong., 220%<br>Tear, 69 lb./in | 4<br>14<br>28 | 1<br>0<br>0 |
| 15—Ethylene carbonate | Tensile, 857 p.s.i.<br>Elong., 320%<br>Tear, 53 lb./in | 4<br>14<br>28 | 3<br>2<br>0 |
| 16—Bis(orthochlorophenyl) carbonate | Tensile, 895 p.s.i.<br>Elong., 390%<br>Tear, 63 lb./in | 3<br>14<br>28 | 0<br>0<br>5 |
| 17—Bis(orthophenylphenyl) carbonate | Tensile, 860 p.s.i.<br>Elong., 440%<br>Tear, 77 lb./in | 3<br>14<br>28 | 0<br>3<br>5 |
| 18—Bis(orthocresol) carbonate | Tensile, 940 p.s.i.<br>Elong., 580%<br>Tear, 93 lb./in | 3<br>14<br>— | 0<br>3<br>— |
| 19—di(n-butyl) carbonate | Tensile, 900 p.s.i.<br>Elong., 310%<br>Tear, 73 lb./in | 3<br>14<br>24 | 2<br>2<br>5 |
| 20—Bis(orthomethoxyphenyl) carbonate | Tensile, 800 p.s.i.<br>Elong., 380%<br>Tear, 89 lb./in | 3<br>14<br>24 | 2<br>2<br>5 |
| 21—Diethyl carbonate | Tensile, 900 p.s.i.<br>Elong., 340%<br>Tear, 77 lb./in | 3<br>14<br>24 | 2<br>0<br>5 |
| 22—Organic polycarbonate.[1] | Tensile, 643 p.s.i.<br>Elong., 240%<br>Tear, 73 lb./in | 6<br>10 | 4<br>4 |
| 23—Organic polycarbonate.[2] | Tensile, 940 p.s.i.<br>Elong., 280%<br>Tear, 86 lb./in | 3<br>10<br>— | 0<br>3<br>— |

[1] This organic polycarbonate which was a solid, finely divided resin, having an intrinsic viscosity in benzene of 0.55, was obtained by interacting Bisphenol-A and phosgene in the manner described in the aforesaid Fox application, Serial No. 520,166. It was incorporated in the form of a 25% methylene chloride solution.

[2] Prepared similarly as the polycarbonate used in Sample No. 22. This resin had an intrinsic viscosity in benzene of about 0.2 (lower molecular weight) and was incorporated in the form of a 10% methylene chloride solution.

It will of course be apparent to those skilled in the art that the amelioration of the undesirable effects of other structure-inducing fillers as well as those which cause undesirably long knit times is intended to be included within the scope of the present invention. Moreover, other convertible organopolysiloxanes, for instance, convertible ethyl polysiloxanes, convertible methyl phenyl polysiloxanes, as well as other organic carbonates, many examples of which have been given above, may be employed in place of the convertible methylpolysiloxane, methyl vinyl polysiloxane, and methyl vinyl phenyl polysiloxane and organic carbonates described in the foregoing examples. The proportions of ingredients may be varied widely as may the other conditions recited above without departing from the scope of the invention. The application involved, the organopolysiloxane used, the filler employed, the additive incorporated, etc. will all contribute to the relationship between the ingredients, as far as proportions and selection thereof are concerned. Obviously, other fillers which do not induce structures and which do not undesirably affect knit times, such as, for instance, titanium dioxide, ferric oxide, calcium carbonate, etc., may be incorporated in combination with the structure-inducing filler.

I have discovered that when employing the organic carbonates, particularly with ethylene (e.g., vinyl) containing convertible organopolysiloxanes, the relationship between the vinyl content and the amount of organic peroxide vulcanizing agent employed will affect the percent elongation of molded samples. Thus, the following Table VII shows this relationship in connection with a methylpolysiloxane gum of about $3.5 \times 10^6$ centipoise viscosity (5000 penetration gum) containing calcium carbonate as a filler and employing benzoyl peroxide as a curing agent. The following Table VII shows the differences in percent elongation of molded sheets obtained by curing similarly as was done in Example 2 and heat aging at one hour at 150° C. in an air circulating oven.

*Table VII*

EFFECT OF VINYL ON CHAIN IN POLYMER AND PEROXIDE LEVEL AT CONSTANT MOLECULAR WEIGHT

| Percent Elongation | Mol Percent Vinyl | Percent Benzoyl Peroxide |
|---|---|---|
| 210 | 0.2 | 0.5 |
| 165 | 0.2 | 1.5 |
| 140 | 0.2 | 4.0 |
| 280 | 0.1 | 0.5 |
| 200 | 0.1 | 1.5 |
| 170 | 0.1 | 4.0 |
| 380 | 0.05 | 0.5 |
| 245 | 0.05 | 1.5 |
| 190 | 0.05 | 4.0 |

Further variations in properties can be obtained by varying the molecular weight of convertible organopolysiloxanes, particularly methyl vinyl polysiloxane, which seems to behave differently from convertible methylpolysiloxanes free of silicon-bonded vinyl groups. Thus, two formulations were prepared composed of 100 parts of a methyl vinyl polysiloxane gum (employing two polysiloxanes of different viscosities), 40 parts of fume silica treated with octamethylcyclotetrasiloxane, 2 parts diphenylsilanediol, 3 parts of dimethyldiethoxysilane, and 2 parts red iron oxide. This formulation was mixed in a dough mixer for one hour at 100-115° C. and thereafter 2 parts benzoyl peroxide were added and the samples molded similarly as in Example 2. After heat aging for one hour at 150° C., the physical properties of the cured sample made from a methyl vinylpolysiloxane (containing 0.2 mol percent silicon-bonded vinyl groups) having a viscosity of $3.5 \times 10^6$ centipoises (5000 penetration gum) were as follows:

Tensile _____ p.s.i__ 760
Elongation _____ percent__ 280
Tear _____ lb./in__ 74

A sample employing a methyl vinylpolysiloxane having a viscosity of $4.2 \times 10^5$ centipoises had the following properties:

Tensile _____ p.s.i__ 940
Elongation _____ percent__ 580
Tear _____ lb./in__ 160

The fact that the above relationship of vinyl content, peroxide content and viscosity gave the results described above was entirely unexpected and in no way could have been predicted in view of the fact that when one employs convertible methylpolysiloxane gums free of silicon-bonded vinyl groups, the opposite results are obtained. Thus, as shown in Warrick Patent 2,541,137, as the viscosity (i.e., the molecular weight of a methylpolysiloxane gum free of silicon-bonded vinyl groups) increased, the physical properties also increased. As can be seen from Table VII and the data above with regard to varying the viscosity of a methyl vinylpolysiloxane gum, the physical properties increased as the viscosity decreased.

The optimum conditions for realizing these improved properties in methyl vinylpolysiloxane gums involve those where the convertible methyl vinylpolysiloxane contains from 0.03 to 0.12 mol percent vinyl groups attached directly to silicon by carbon-silicon linkages, the organic peroxide curing agent ranges from 0.5 to 6 percent, by weight, based on the weight of the convertible methyl vinylpolysiloxane, and the viscosity of the methyl vinylpolysiloxane gum is within the viscosity range of from $1 \times 10^5$ to $6 \times 10^6$ centipoises when measured at 27° C. The peroxide catalyst employed and the type of filler used (particularly fillers of the reinforcing type) may be varied, as evidenced by the many examples of these ingredients which have been given above. The incorporation of an organic carbonate in the aforesaid samples will reduce the structure-forming characteristics and additionally improves the processing of the compositions as well as some of the physical properties.

The compositions herein described having reduced structure and lower knit times can be advantageously employed in extrusion, molding, and calendering applications. Alternatively, these compositions may be dissolved and/or dispersed in suitable solvents or dispersing agents, and used for coating and impregnating purposes for coating glass tape, glass fibers, glass fiber sheets, asbestos cloth, etc. In the latter instance, glass cloth can be coated with convertible organopolysiloxanes herein described containing filler, curing agent, and the particular glycol carbonate additive, and thereafter the coated glass cloth can be wrapped around mandrels to make heater ducts, and cured under heat and pressure to give unitary structures having outstanding heat resistance and outstanding cohesive strength between the plies of glass cloth layers. Compounds prepared in the above manner can be readily extruded over electrical conductors and can be heat treated at elevated temperatures in order to obtain a smooth, coherent, cured insulation having good thermal stability.

Because of the ability to calender or coat glass cloth or other heat-resistant fiber bases with the compositions herein disclosed due to the extremely low structure of the silicone rubber coating compound, and the marked adhesion of cured sections of such latter compositions, it is possible to prepare insulating tapes of superior toughness and electrical properties. Supported or unsupported tapes (i.e., tapes made only from extruded or molded films without any backing) can be used to insulate various electrical assemblies and, in particular, can be used as insulation for motors and generators. Tapes can be prepared from mixtures of, for instance, a cured backing composed (either with or without a glass cloth insert or backing) of about 100 parts of an organopolysiloxane gum convertible to the cured, solid, elastic state, from 20 to 100 parts of a reinforcing filler (for example, silica aerogel, fume silica, precipitated silica, etc.) which filler may be treated, for instance, with octamethylcyclotetrasiloxane, and varying amounts of the organic carbonate ranging from about 0.5 to 6 to 8 parts or more, by weight, based on 100 parts of the convertible organopolysiloxane. Included in the formulation may be employed, for instance, small amounts of iron oxide (1 to 6 parts iron oxide), together with curing agents therefore, many examples of which have been given above. Such a backing may be heat-treated at elevated temperatures under pressure to form a strong, heat-resistant tape, upon which can be calendered the same curable composition as is used for the backing. This tape can then be used to insulate various electrical products, such as conductors (e.g., copper or aluminum cores, etc.), generators, motors, coils, etc., by wrapping the tape around the particular structure desired to insulate, thereafter completing the cure of the curable portion of the tape to give a unitary structure which has marked strength and marked cohesive and adhesive properties, as well as good electrical properties.

The compositions herein described have eminent suitability in the manufacture of multiple layers, for instance, two-layer, laminated adhesive sheet material which is employed as insulation for electrical conductors by wrapping the conductor with the sheet or tape material. Various methods may be employed for making such adhesive sheet material. One method comprises extruding or otherwise forming a tape or sheet of the composition described herein and converting it to the substantially cured, solid, elastic state and thereafter applying to a surface of this sheet or tape, for instance, by knife coating or by calendering the latter with a layer of heat-curable adhesive material, for instance, adhesive made from the organopolysiloxane formulation used to make the backing. To facilitate application of the adhesive layer, it may be desirable to dissolve or disperse the adhesive portion in a suitable solvent, such as xylene and toluene, and after application to the backing, the adhesive layer is advantageously subjected to a slight heat treatment either alone or accompanied by forced air circulation to remove the solvent. Slight application of heat will also serve the purpose of reducing the tackiness of the adhesive layer. The thickness of the adhesive layer may vary within the same ranges as the backing although, for practical purposes, the adhesive layer may be thinner (preferably from 0.003" to 0.015") than the backing.

The two-layer laminated adhesive sheet material is then employed in such application as, for instance, in the insulation of electrical conductors by wrapping the conductor with the sheet or tape material of this invention. In making use of a tape, this is generally accomplished by first rolling up the tape upon itself and thereafter continuously unwinding it while simultaneously wrapping it around the conductor. Often this manner of conductor insulation is the only practical manner of conveniently applying insulation to a conductor.

Once the tape is applied to the base member, such as the electrical conductor, it can then be subjected to further vulcanization (advantageously under pressure) by heating it to a temperature of above 100° C., for instance, at temperatures of from 125° to 200° C., for times varying from about 5 minutes to three or four hours, either within or outside a mold (employing steam vulcanization if desired), whereupon the overlapped layers of the tape will fuse to form a unitary, substantially void-free insulation around the conductor. Because of the ability to use backings of high-strength characteristics, particularly tensile and tear strength, conductors insulated in the above fashion can be used in winding operations at high speeds, or can be thereafter bent or manipulated, particularly when used to insulate stator bars and coils prior to insertion in the larger electrical equipment for which the stator bars were fabricated.

Alternatively, one may interpose a backing of the cured compositions of the above invention which is further strengthened by the use of a fibrous sheet or tape such as that obtained from glass cloth, asbestos cloth, glass fibers, etc. This reinforced backing may contain the cured silicone rubber composition either on one side thereof (which ordinarily will be closest to the adhesive layer) or the reinforcing fibrous material may be sandwiched between layers of cured silicone rubber formulations.

Additional methods of making adhesive sheet material and tapes from the compositions of matter herein described and claimed and uses for such adhesive articles of manufacture may be found described in U.S. Patent 2,789,155 issued April 16, 1957, and U.S. Patent 2,708,289, issued May 17, 1955. By reference as far as the pertinent disclosures thereof are concerned, these two patents are made part of the disclosures of the instant application.

What I claim as new and desire to secure by Letters Patent of the United States is:

1. A composition of matter comprising (1) an organopolysiloxane convertible to the cured, solid, elastic state, and containing an average of from 1.95 to 2.05 organic groups per silicon atom in which the organic groups are selected from the class consisting of methyl, vinyl, and phenyl radicals, at least 50% of the organic groups being methyl groups, (2) a structure-inducing filler, and (3) from 0.05 to 10 percent, by weight, based on the weight of (1) of an organic carbonate.

2. A composition of matter having reduced structure and lower knit time comprising (1) an organopolysiloxane convertible to the cured, solid, elastic state and containing an average of from 1.95 to 2.05 organic groups per silicon atom in which the organic groups are selected from the class consisting of methyl, vinyl, and phenyl radicals, at least 50% of the organic groups being methyl groups, (2) a structure-inducing filler and (3) from 0.05 to 10 percent, by weight, based on the weight of (1) of an additive for reducing the aforesaid structure and knit time comprising an organic carbonate.

3. A composition as in claim 2 in which the filler is a finely divided structure-inducing silica filler.

4. The composition of claim 3 in which the organic carbonate is diethylene glycol bis-(2-n-butoxyethyl) carbonate.

5. The composition of claim 3 in which the organic carbonate is glycerol carbonate.

6. The composition of claim 3 in which the organic carbonate is propylene carbonate.

7. The composition of claim 3 in which the organic carbonate is bis-(orthocresol) carbonate.

8. The composition of claim 3 in which the organic carbonate is diethyl carbonate.

9. A composition of matter comprising (1) an organopolysiloxane convertible to the cured, solid, elastic state, (2) a structure-inducing filler, (3) from 0.05 to 10%, by weight, based on the weight of (1) of an organic carbonate and (4) an organoperoxy curing agent.

10. The process for reducing the structure and knit time of an organopolysiloxane convertible to the curved, solid, elastic state and containing an average of from 1.95 to 2.05 organic groups per silicon atom, in which the structure is caused by the presence of a finely divided structure inducing filler, which process comprises incorporating in the said organopolysiloxane from 0.05 to 10%, by weight, based on the weight of the latter, of an organic carbonate.

References Cited in the file of this patent

UNITED STATES PATENTS

| | | |
|---|---|---|
| 2,455,652 | Bralley | Dec. 7, 1948 |
| 2,590,812 | Barry | Mar. 25, 1952 |
| 2,744,878 | Smith-Johannsen | May 8, 1956 |
| 2,774,697 | Koblitz | Dec. 18, 1956 |
| 2,789,966 | Reynolds | Apr. 23, 1957 |

FOREIGN PATENTS

| | | |
|---|---|---|
| 786,434 | Great Britain | Nov. 20, 1957 |